Feb. 22, 1966 J. H. MacNEILL ETAL 3,236,353
STRIP-PRINTER PUNCH
Filed Nov. 27, 1961 14 Sheets-Sheet 8

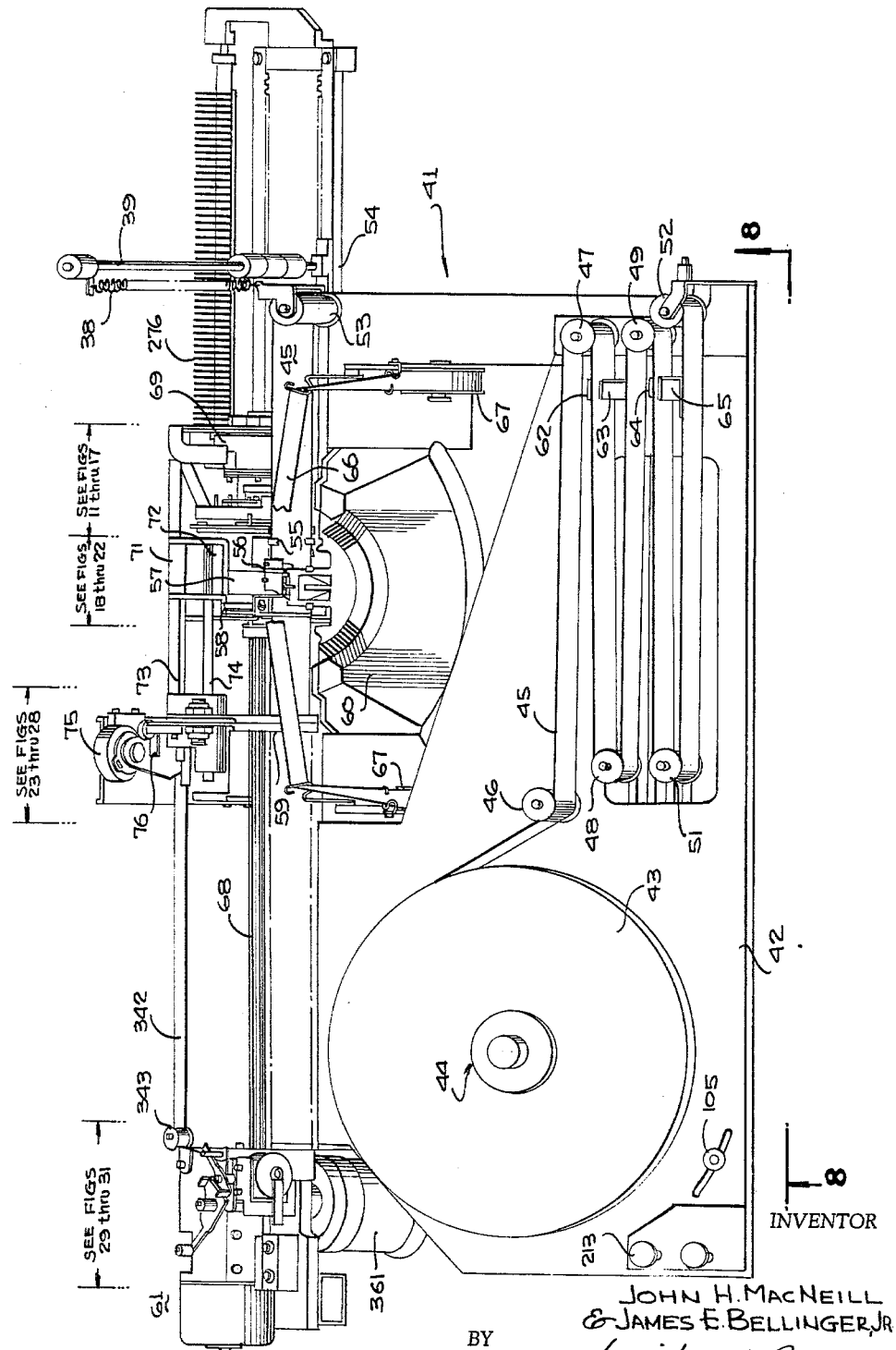

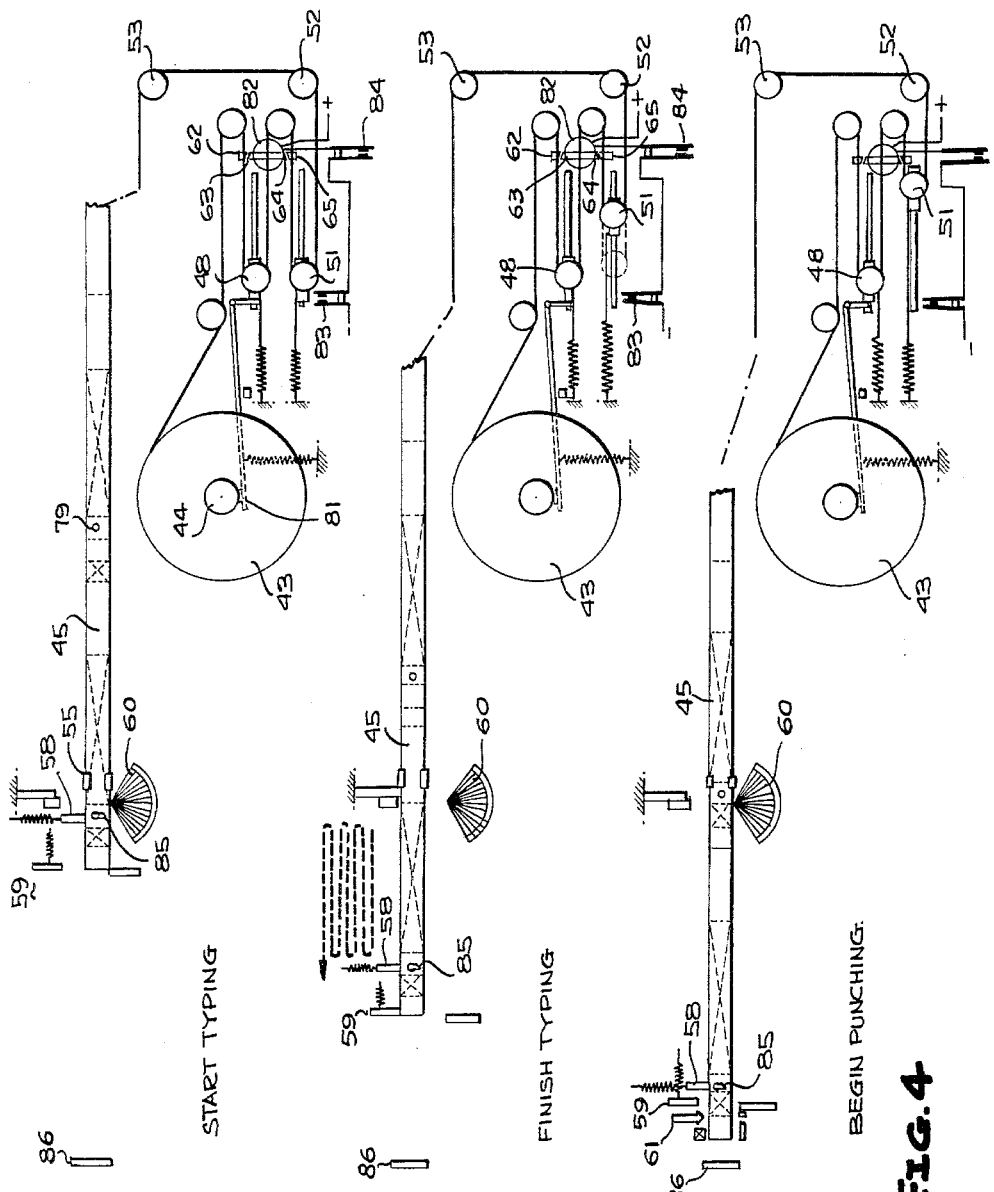

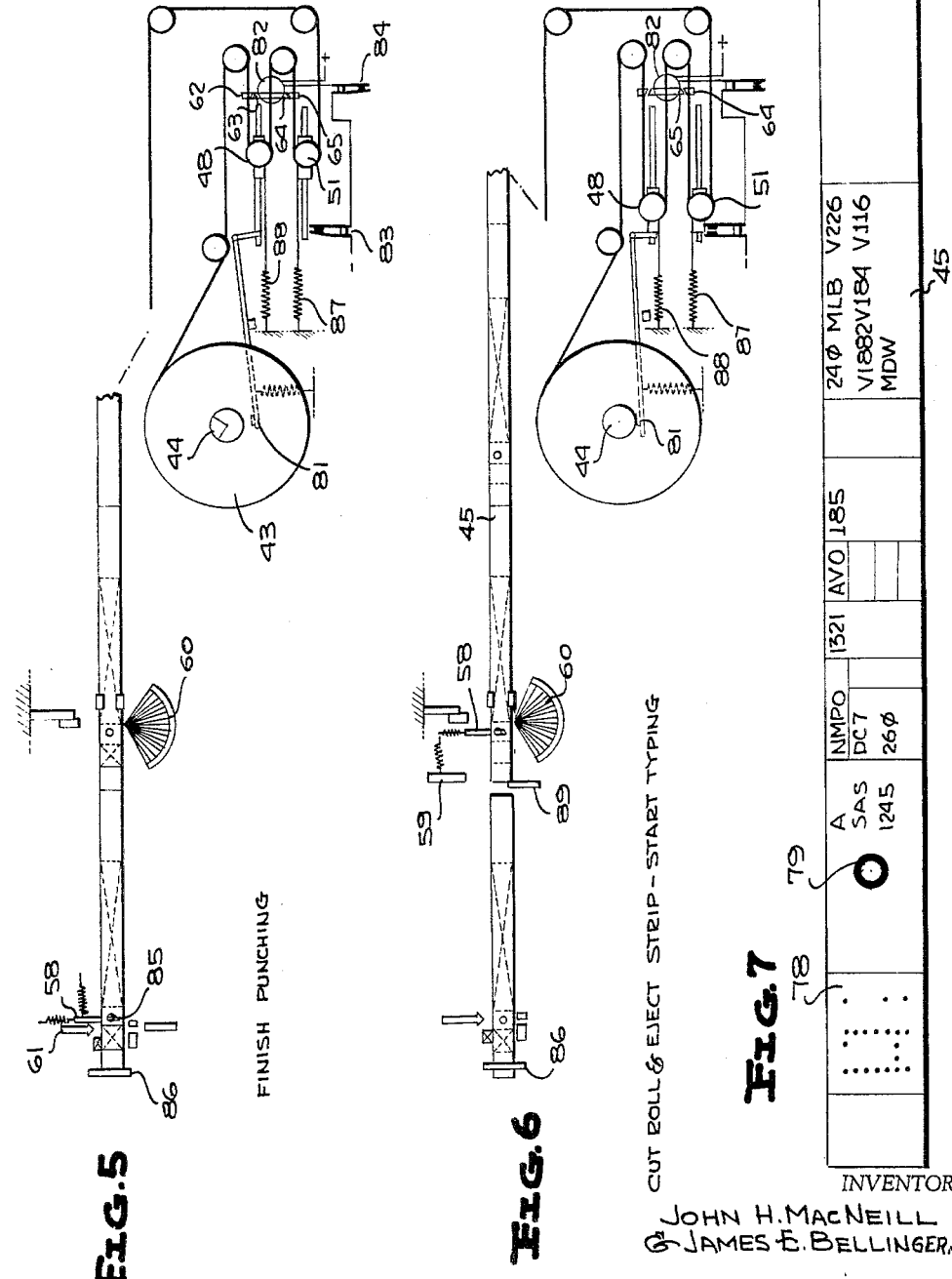

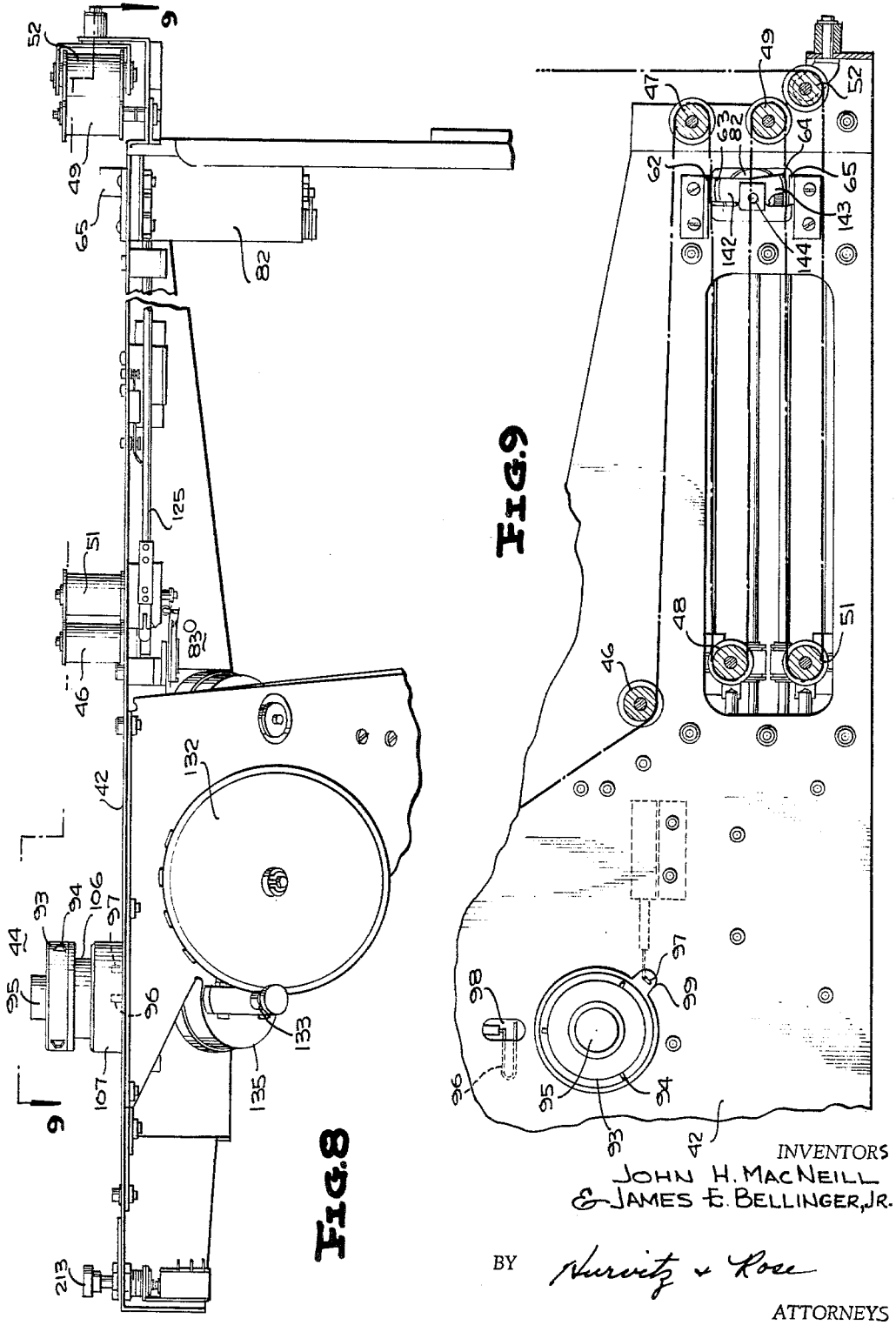

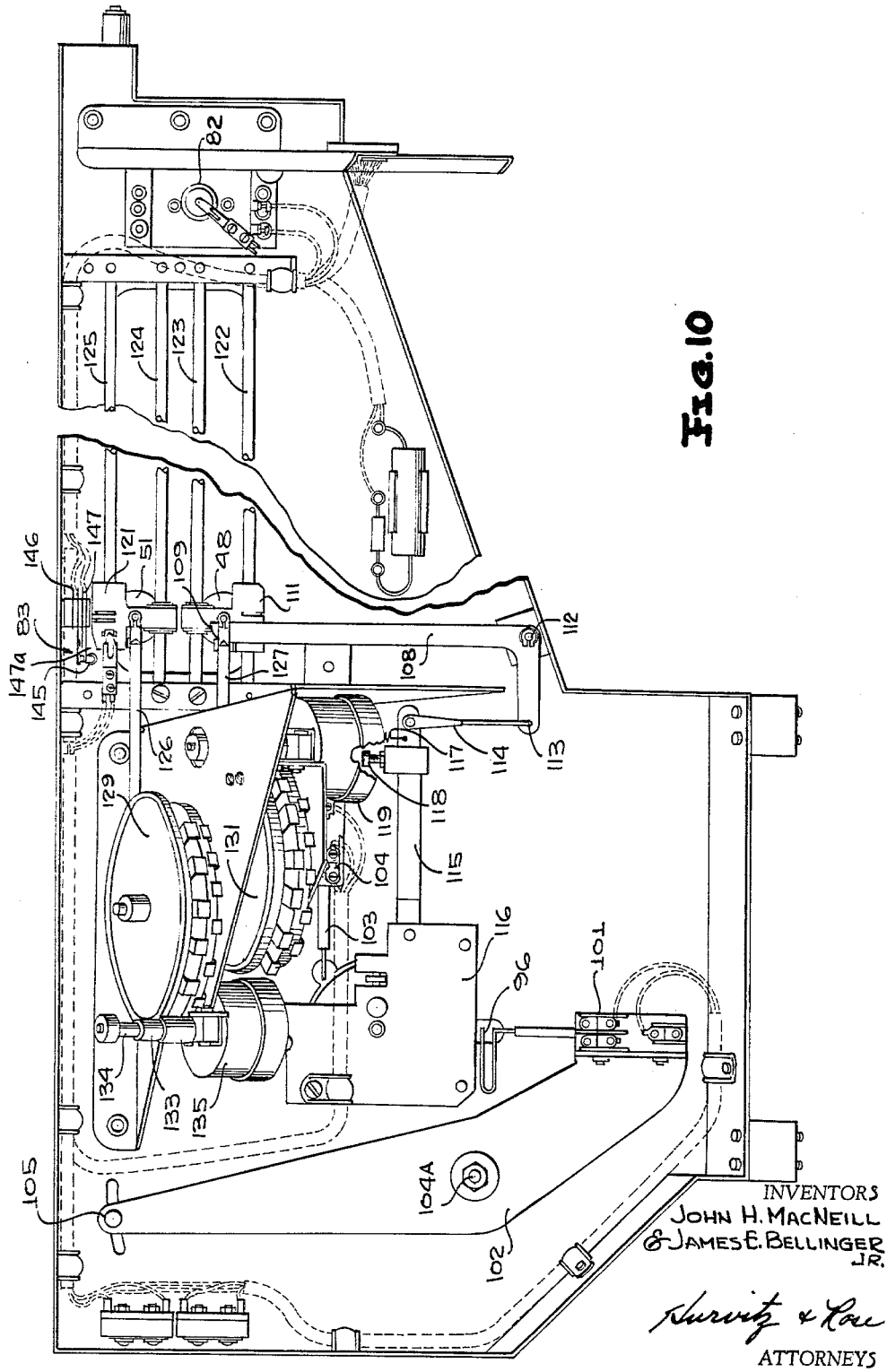

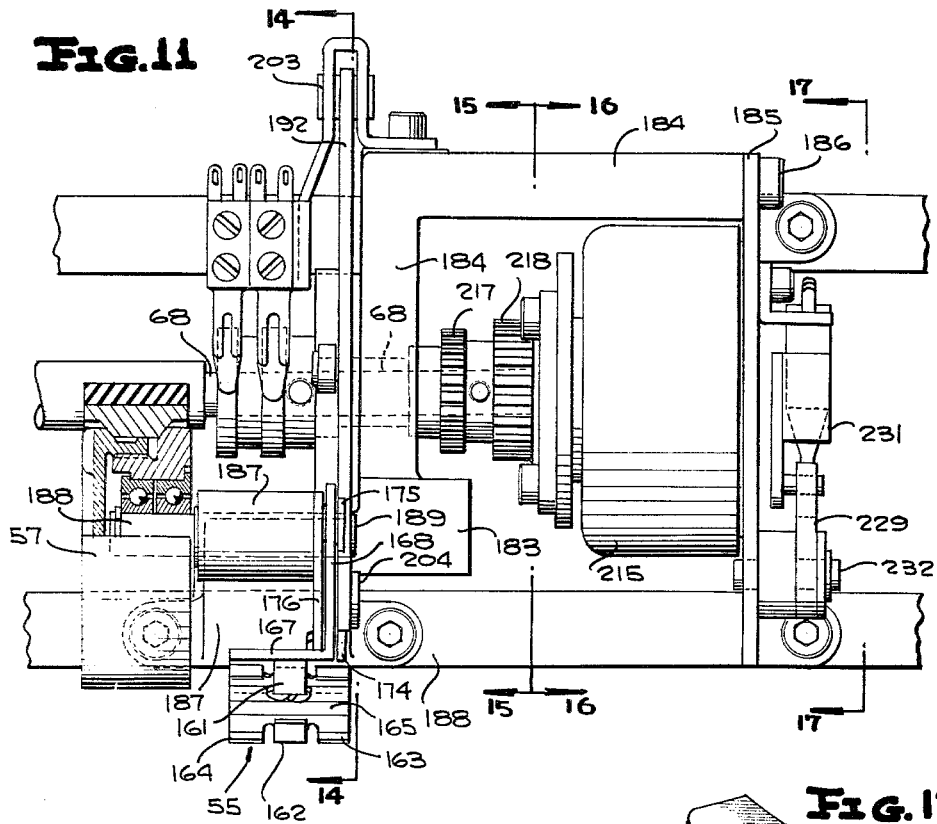
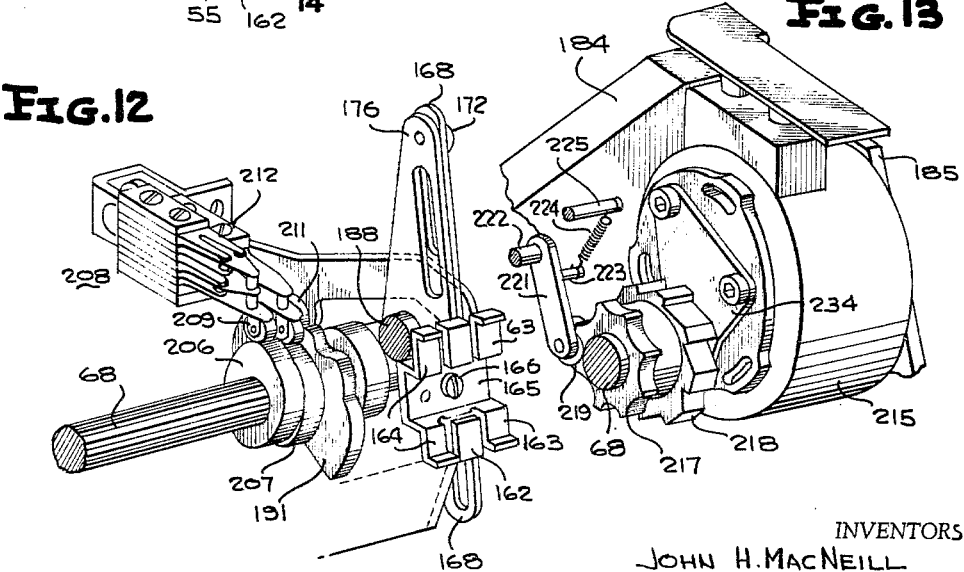
INVENTORS
JOHN H. MacNEILL
& JAMES E. BELLINGER, JR.
BY Hurvitz & Rose
ATTORNEYS

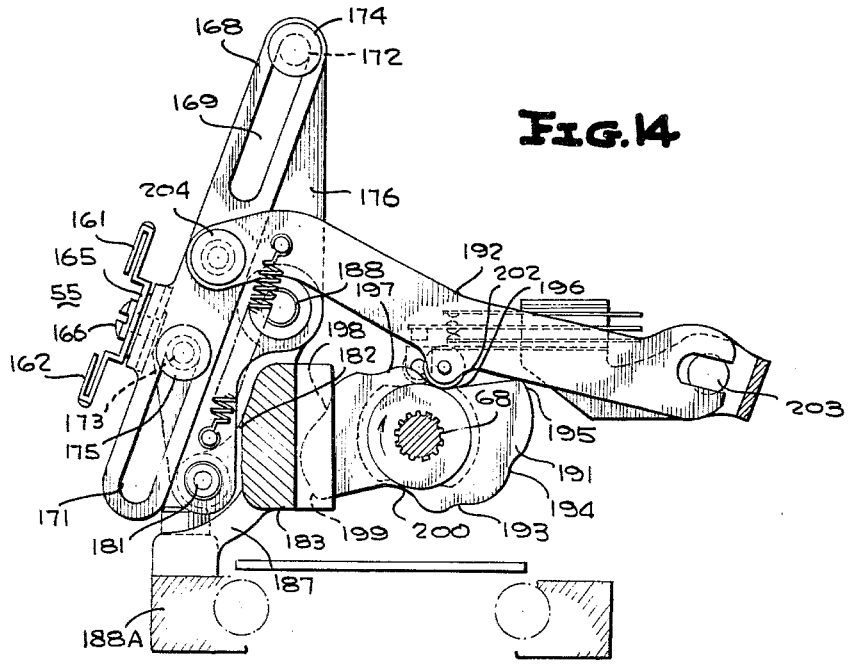
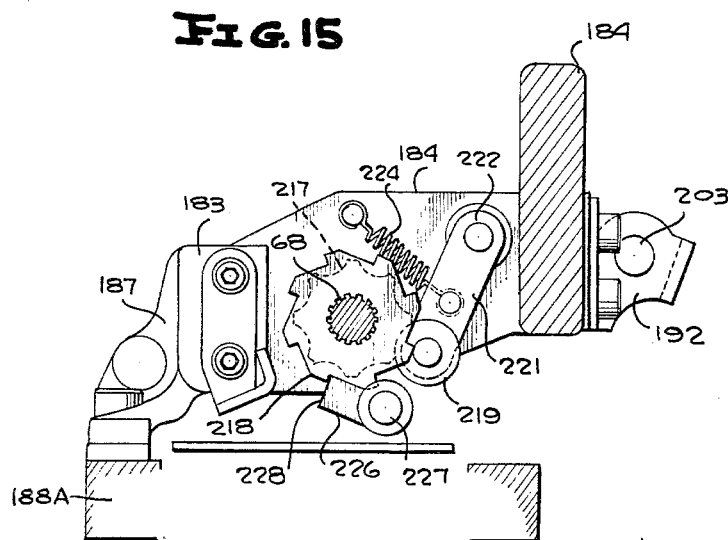

INVENTORS
JOHN H. MacNEILL
& JAMES E. BELLINGER, JR.
BY Hurvitz & Rose
ATTORNEYS

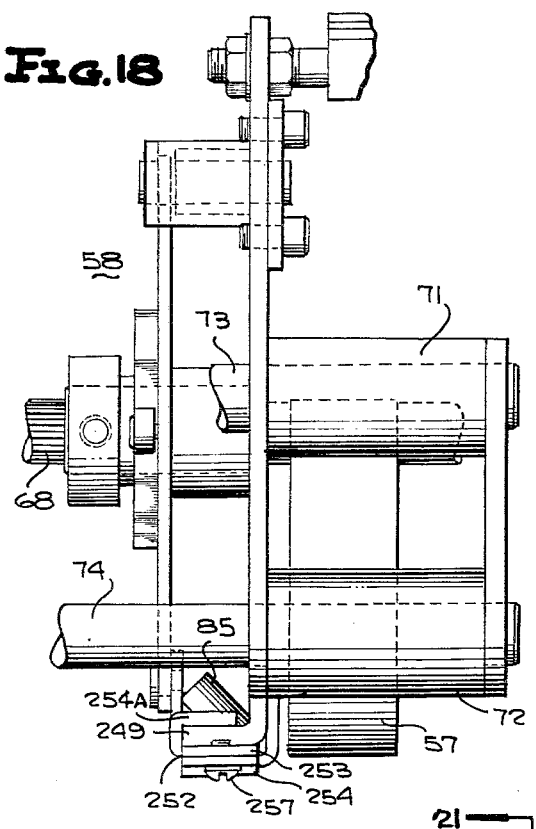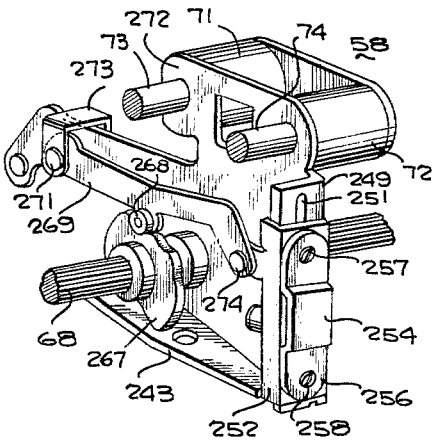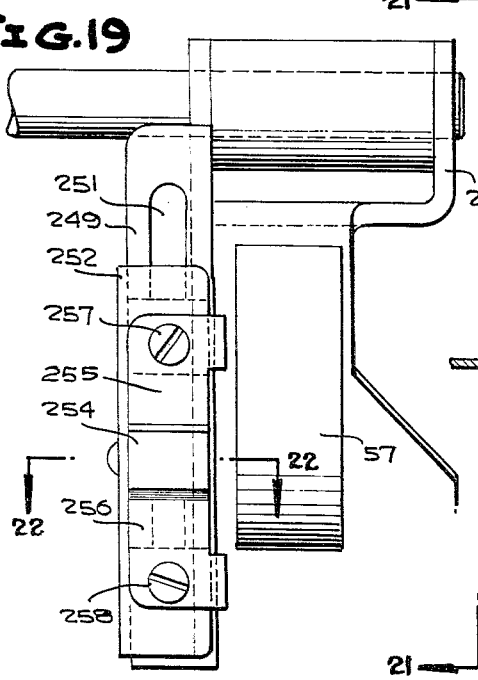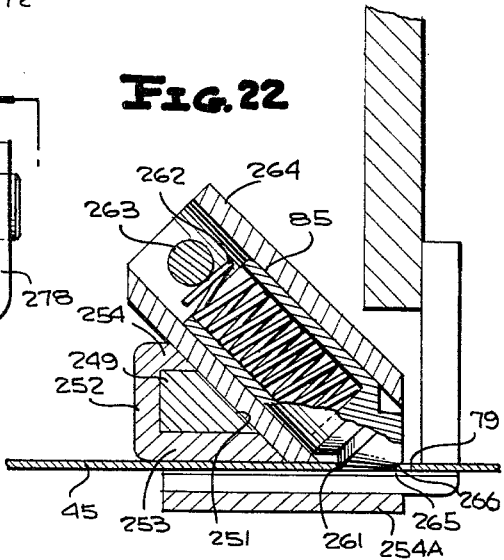

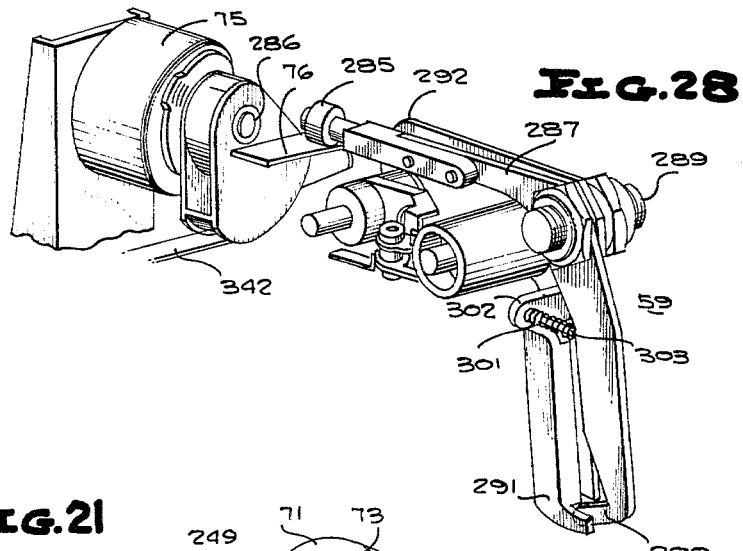
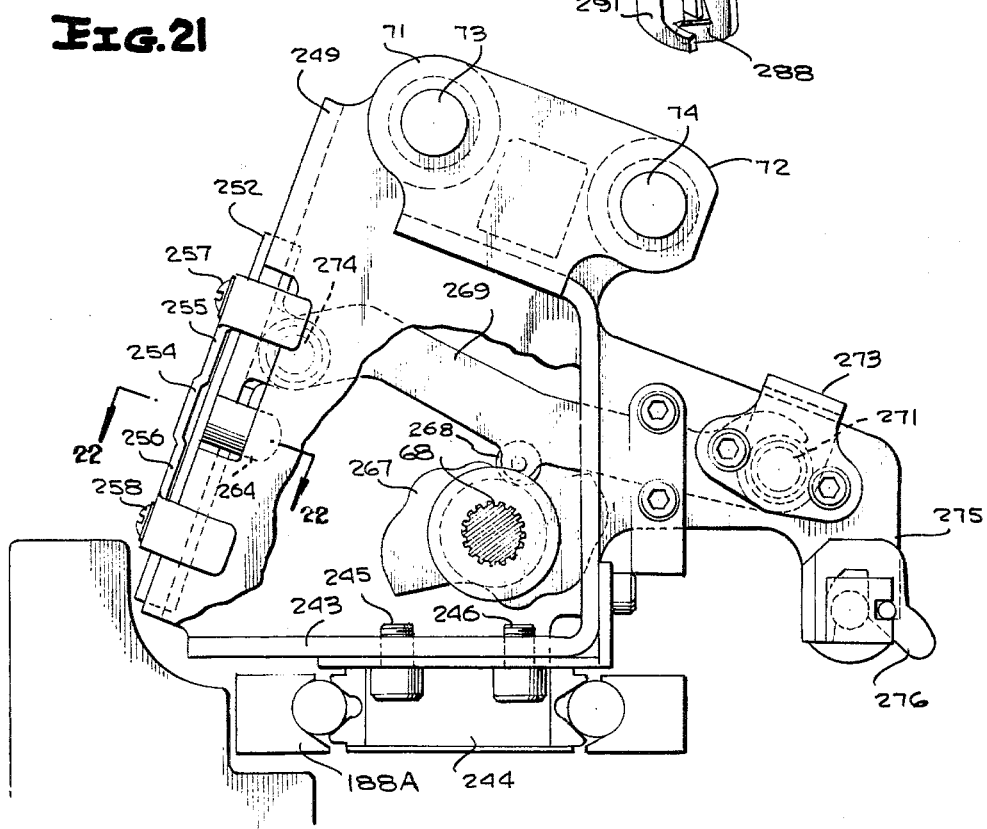

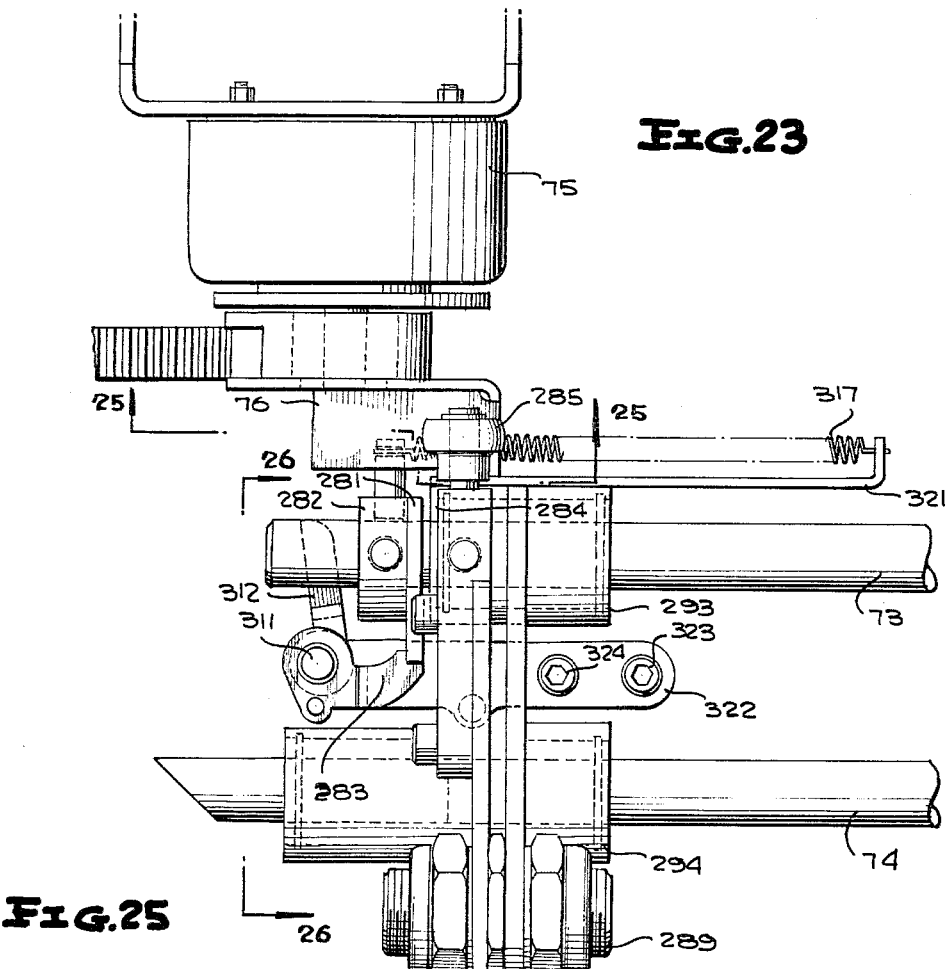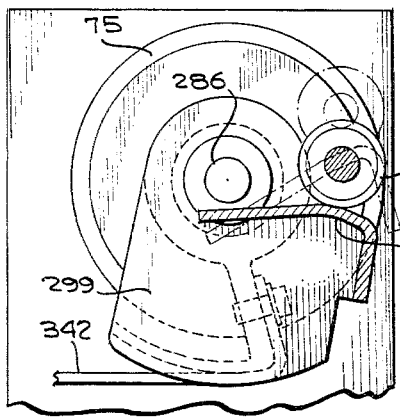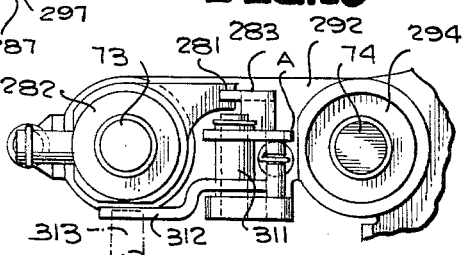

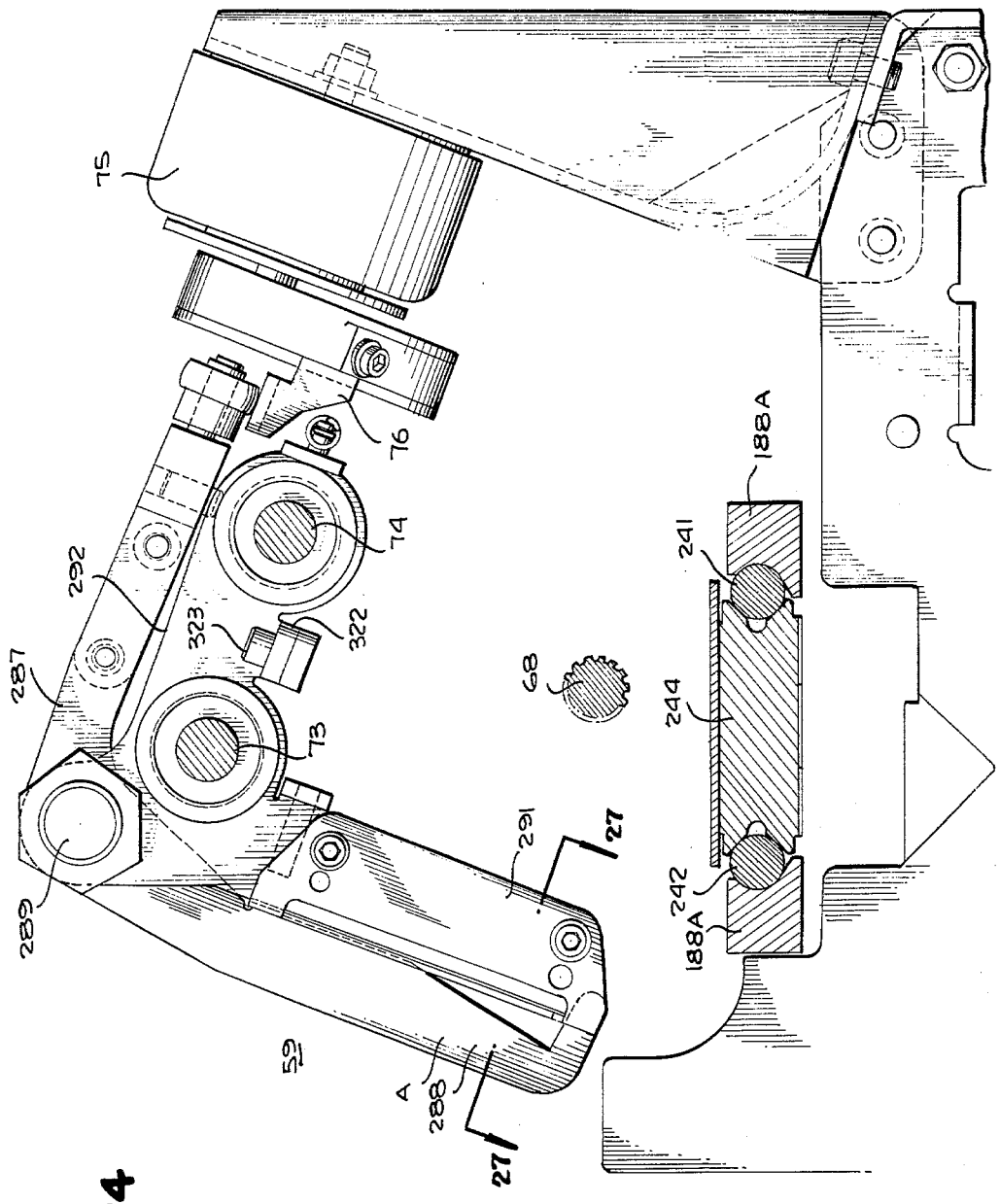

Feb. 22, 1966 J. H. MacNEILL ETAL 3,236,353
STRIP-PRINTER PUNCH
Filed Nov. 27, 1961 14 Sheets-Sheet 13
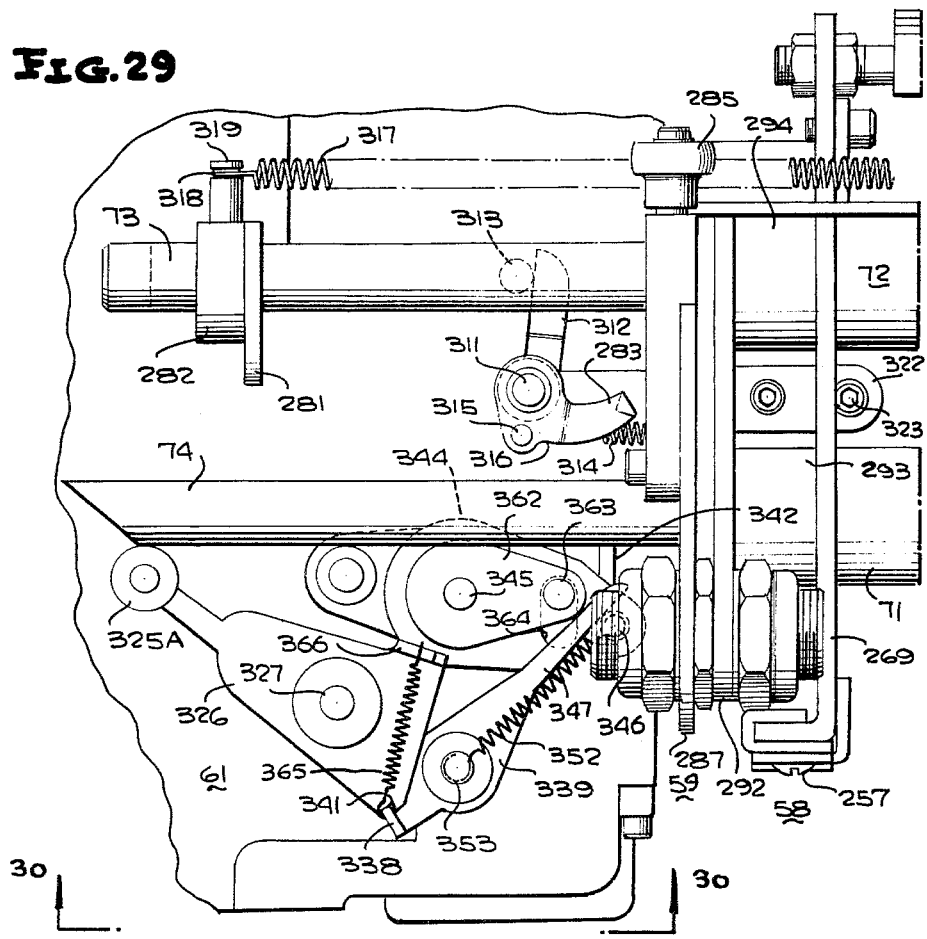
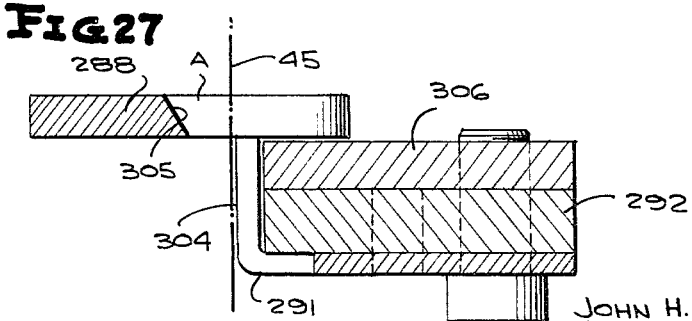
INVENTORS
JOHN H. MACNEILL
& JAMES E. BELLINGER, JR.
BY *Hurvitz & Rose*
ATTORNEYS Feb. 22, 1966   J. H. MacNEILL ETAL   3,236,353
STRIP-PRINTER PUNCH Filed Nov. 27, 1961   14 Sheets-Sheet 14

INVENTORS
JOHN H. MacNEILL
& JAMES E. BELLINGER, JR.

BY *Hurvitz & Rose*

ATTORNEYS

United States Patent Office 3,236,353
Patented Feb. 22, 1966

3,236,353
STRIP-PRINTER PUNCH
John H. MacNeill, Indiatlantic, and James E. Bellinger, Jr., Eau Gallie, Fla., assignors to Soroban Engineering, Inc., Melbourne, Fla., a corporation of Florida
Filed Nov. 27, 1961, Ser. No. 154,948
1 Claim. (Cl. 197—133)

The present invention relates generally to an automatic data presentation system and more particularly to a system for automatically feeding a continuous strip through a printer and puncher and for cutting the strip into predetermined lengths.

A need has arisen in connection with posting information relative to aircraft flight times, courses and destinations for a machine which automatically and rapidly prints and punches information on a separate strip of paper for each aircraft to be observed by and controlled from a control center. Each separate strip must not be of excessive length to permit ease in handling and visual inspection. Consequently, the printing mechanism must be capable of quickly printing a plurality of lines rather than merely a single line containing the data which is to be visually presented. Further, after the strip has been processed and placed in a display rack along with strips bearing information relating to other craft in its vicinity, it must be capable of being located automatically so that updating information may be added thereto without requiring removal of the strip from the display console. The updating mechanism locates a particular strip by coded information displayed along a specific part of the strip in the form of an array of apertures. In order to facilitate precise location of the strip and therefore of the coded apertures and various columns of information in the display console, the strip must be cut to a precise length.

The machine of the present invention, in order to meet the above requirements, must therefore be able to rapidly print several lines of information and punch a code, each at precise locations on the strip and thereafter cut the strip to a precise length. The machine of the invention employs a large paper supply wherein paper may be quickly paid out without the supply impeding the paying out process. This is accomplished by a pair of spring loaded translatable rollers which receive the strip being fed and define a pair of loops therein. Before each loop is a brake, only one of which is actuated at a time by a solenoid. A further brake, for the supply roll, is coupled to the first translatable roller, i.e., the one closest along the strip to the roll of paper. Under normal conditions, the second brake, i.e., the one located between the two loops formed in the strip and the one on the supply roll are actuated and the first translatable roller, the one furthest from the supply roll, is moved back and forth in response to movement of a carriage which controls movement of the paper through the printer. The spring loading of the roller maintains the strip in the printer taut. When it is desired to pay out some of the paper, this occurring when the first loop is almost exhausted, the brake position is reversed so that the first brake, i.e., the one closest to the roll along the paper strip path, is actuated and the other brake is released. The spring associated with the first roller is stronger than that associated with the second roller, and therefore paper is drawn from the second loop and supplied to the first loop. Upon completion of the paying out process, the second brake is actuated, the normally actuated supply roll brake is de-actuated, and the second roller is translated to its initial position causing an additional strip to be payed off of the supply roll. In this way, the printing mechanism has only to overcome the force of the spring associated with the first roller and is isolated from the inertia of the supply roll.

The paper or strip is fed past a printing station or mechanism which comprises a standard automatic typewriter ribbon carrying mechanism and a small non-translatable platen. On the side of the printing mechanism remote from the paper supply, a spring-biased finger is inserted in an aperture preformed in the paper, said aperture being located just past the portion of the strip which is to be printed. The finger which reciprocates the paper strip horizontally for printing and positioning is included in a paper holding mechanism having a bridge through which the paper passes. This paper holding mechanism, together with one located on the opposite side of the typewriter ribbon mechanism, is vertically oscillatable and constitutes the line feeding mechanism of the printer. This is accomplished without control by the platen which merely rolls freely behind the ribbon-carrying mechanism and the paper.

After the requisite information has been printed on the strip, the finger and the paper-holding mechanism in which it is included are translated towards a punching mechanism located at the end of the machine remote from the printing mechanism. Translation of the finger and paper-holding mechanism results in similar translation of the paper strip due to coaction between the finger and the paper. A paper-cutting mechanism or guillotine, which is located between the paper-holding mechanism and the punch, is also translated in proximity to the punch.

When the paper is brought into proximity to the punch, it is inserted therein and fed past a vertical column of punching pins while still under control of the aforesaid feeding mechanism. The pins successively punch single columns of holes in a portion of the paper in front of both the aperture and printing, said holes being indicative of the printed matter. After each column is punched, the paper is fed segment-by-segment into position for the next column to be punched by translatory movement of the paper holder and finger. During the punching operation the cutting mechanism remains stationary.

After the punching operation is complete, the translatable paper-holding mechanism, carrying a pair of large inertia members, comes into direct contact with the guillotine. A rod carrying both the guillotine and translatable paper holder is then forced into contact with a roller secured to the punch. In response to the force imparted to it by the rod movement and the inertia members, the roller rotates an arm which ultimately actuates a brake located interiorly of the punch mechanism. This brake holds the paper strip as the paper holder now begins to return in the direction of the ribbon carrier. The finger engaging the aperture of the sheet is withdrawn and the paper remains fixed in place.

As the paper holder is translated in proximity to the ribbon carrier, the cutting or guillotine structure is translated therewith and returns to it initial position relative to the paper holder. When the guillotine is returned, a signal is generated by the drive mechanism, the guillotine is actuated, and the paper strip is sheared. As the paper strip is being sheared, the translatable paper holder engages another aperture in the next strip segment to be processed. Upon completion of the shearing process, the brake which has been maintained in a locked position within the punch assembly is released and a punch roller for ejecting the previously sheared strip is actuated causing ejection of the strip from the machine.

Accordingly, it is an object of the present invention to provide a new and improved automatic system for preparing data presentation strips.

An additional object of the present invention is to provide a new and improved apparatus for printing a plurality of discrete lines on a strip taken from a roll of printable material and subsequently severing the printed strip from the roll.

A further object is to provide a new and improved appartus for rapidly and accurately feeding a predetermined length of printable material from a massive supply roll thereof.

An additional object is to provide a new and improved apparatus for feeding a strip of material to a printing station from a high inertia supply roll, for translating the strip through the printing station and for isolating the strip from the inertia of the roll.

Yet another object is to provide new and improved apparatus for automatically feeding a strip of material to a station for printing a plurality of data lines thereon, and thereafter feeding said strip to a station for punching coded data thereon.

A further object is to provide new and improved apparatus for automatically feeding a strip of material to a station for printing a plurality of data lines thereon, and thereafter feeding said strip to a station for punching coded data thereon and subsequently cutting said strip from its supply.

Yet an additional object is to provide new and improved appartus for automatically feeding a strip of material to a station for printing a plurality of data lines thereon, thereafter feeding said strip to a station for punching coded data thereon and subsequently cutting and removing said strip from its supply.

A still further object is to provide new and improved apparatus for automatically feeding a strip of material to a station for printing a plurality of data lines thereon, thereafter feeding said strip to a station for punching coded data thereon, subsequently cutting said strip from its supply and ejecting the cut strip from the apparatus.

A still further object of the present invention is to provide a new and improved strip or web position control mechanism.

Yet another object is to provide a new and improved mechanism for controlling the vertical position of a strip or web at a plurality of discrete, predetermined locations.

An additional object of the present invention is to provide a new and improved mechanism for translating a strip or web between a plurality of points.

Another object of the present invention is to provide a new and improved mechanism for controlling the vertical position of a strip or web while it is positioned adjacent a station operating on the strip and for translating the strip relative to said station.

The above and still further objects, features and advantages of the present invention will become apparent upon consideration of the following detailed description of one specific embodiment thereof, especially when taken in conjunction with the accompanying drawings, wherein:

FIGURE 1 is a top perspective view of the entire apparatus according to the present invention;

FIGURES 2–6 are mechanical schematic diagrams illustrating the manner in which the present invention functions;

FIGURE 7 is an illustration of a record strip made by the apparatus of the present invention;

FIGURE 8 is a side view of part of the paper feeding mechanism of the present invention;

FIGURE 9 is a top view of the paper feeding mechanism taken along the lines 9—9 of FIGURE 8;

FIGURE 10 illustrates a bottom view of the paper feeding mechanism;

FIGURE 11 is a top plane view of the stationary paper feed mechanism and platen illustrated in FIGURE 1;

FIGURE 12 is a perspective view of the stationary paper feed mechanism;

FIGURE 13 is a perspective view of the driving mechanism for the spline shaft upon which the stationary paper holding mechanism is mounted;

FIGURE 14 is a side view of the stationary paper holding mechanism taken along the lines 14—14 of FIGURE 11;

FIGURE 15 is a side view of the spline shaft intermittent movement mechanism taken along the lines 15—15 of FIGURE 11;

FIGURE 18 is a top plane view of the translatable paper holding and positioning mechanism;

FIGURE 19 is an elevation view of the translatable paper holding and position controlling mechanism of FIGURE 18;

FIGURE 20 is a perspective view of the translatable paper holding and positioning mechanism;

FIGURE 21 is a side view of the translatable paper holding and controlling mechanism;

FIGURE 22 is a sectional view illustrating the spring loaded rod and catch employed for translating the paper tape, taken along the lines 22—22 of FIGURE 19;

FIGURE 23 is a top plane view of the translatable guillotine mechanism of the present invention;

FIGURE 24 is an elevation view of the guillotine or cutter employed in the present invention;

FIGURE 25 is a sectional view, taken along the lines 25—25 of FIGURE 23, illustrating the manner in which the roller for the paper cutter functions;

FIGURE 26 is a side elevational view of the translatable members and the shaft upon which they slide, taken along the lines 26—26 of FIGURE 23;

FIGURE 27 is a sectional view of the cutting surfaces of the guillotine, said view being taken along the lines 27—27 of FIGURE 24;

FIGURE 28 is a perspective view of the guillotine structure and its actuator;

FIGURE 29 is a top plane view of the punch mechanism and the translatable portion of the guillotine when in proximity to the punch;

Figure 16:
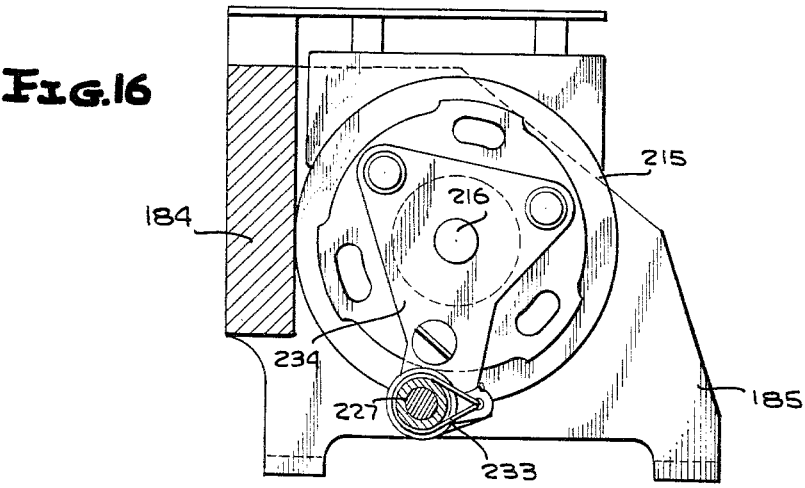
FIGURE 16 is a side sectional view of another part of the spline shaft intermittent feed mechanism, taken along the lines 16—16 of FIGURE 11.
Figure 17:
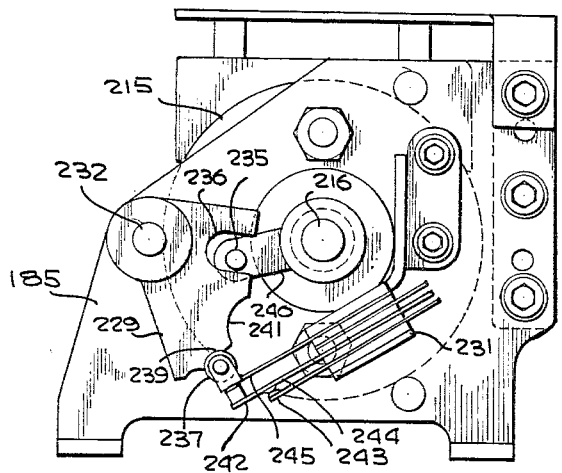
FIGURE 17 is a side view illustrating a switch mechanism to insure complete solenoid action, taken along the lines 17—17 of FIGURE 11.

Reference is now made to the apparatus illustrated in FIGURE 1 of the accompanying drawings which includes a standard typewriter generally designated by the reference numeral 41 upon which is mounted a base plate 42 for the paper feed mechanisms. A roll 43 of paper tape is mounted on spindle 44 secured to base plate 42. Paper 45 from roll 43 is played out to roller 46, mounted in proximity to spindle 44, to roller 47 about which it makes 180° turn, and to translatable roller 48 about which it makes another 180° turn. The paper proceeds to stationary roller 49 about which another 180° turn is effected, and to translatable roller 51 about which the paper makes still further 180° turn. Paper 45 is directed from roller 51 to a further stationary roller 52 about which a 90° turn is effected. From roller 52, the paper proceeds to roller 53, mounted on stationary bar 54 by vertically extending spring 38 and rod 39 so that vertical paper movement is possible at points remote from roller 52. At roller 53, the paper makes a right angle turn and is supplied to a horizontally stationary but vertically movable paper holder and guide 55. From paper holder 55, the paper proceeds past a printing station including ribbon carrying mechanism 56 and narrow stationary platen 57 to horizontally and vertically translatable paper movement control mechanism 58. From control mechanism 58, the paper 45 is supplied to guillotine 59 and punch mechanism 61.

Control of paper tape movement is effected by a brake coupled to spindle 44, by another brake inluding vertically extending fingers 62 and 63, located in proximity to roller 47, and a further brake composed of vertically extending fingers 64 and 65, located in proximity to roller 49.

Typing on the segment of paper 45 extending between ribbon carrier 56 and platen 57 is effected by automatic actuation of the type bars in a type basket 60 in response to an externally generated, coded electrical signal containing the information to be posted. The signal also includes information for controlling paper tape movement in both the horizontal and vertical directions, which will become apparent as the description proceeds. When the keys of the basket 60 are actuated, they strike conventional typewriter ribbon 66 which is moved between ribbon holder 56 and paper 45 in the conventional manner by spools 67, located on opposite sides of the type basket 60.

Paper cutter or guillotine 59 and horizontally sliding paper controller 58 translate in the horizontal direction along splined shaft 68, which extends between punch 61 and a drive 69 for rotating the shaft 68, the drive 69 being stationary and located at the ribbon carrier right of the typing station 56. Mounted upon the same assembly as horizontally movable paper positioner 58; namely, the carriage of the typewriter mechanism, are inertia members 71 and 72 and rods 73 and 74 which extend between guillotine assembly 59 and members 71 and 72. This assembly and guillotine 59 are translatable from the position shown to a position abutting punch 61 by a standard, reversible typewriter carriage movement mechanism. To effect actuation of guillotine 59 to cut paper 45, guillotine actuating solenoid 75 and pivotable plate 76 are mounted where the guillotine mechanism 59 is normally positioned at the start of the printing operation.

Reference is now made to FIGURE 7 of the drawings to illustrate an exemplary strip or message segment as printed, punched and cut from the paper roll 43 of FIGURE 1. At the left side of the strip, a block 78 is provided having holes made by punching mechanism 61, said holes constituting coded data indicative of the data printed on the strip by the typewriter mechanism. Block 78 is black to absorb light used for sensing the coded holes. Located between the punched block 78 and the printed subject matter is an aperture 79 adapted to receive a movable finger employed to translate the paper tape during the typing operation from a position in proximity to the typing apparatus to one in proximity to punch 61 and equipment included therein for braking and ejecting the paper. Printed information is carried on the strip to the right of the hole 79.

Reference is now made to FIGURES 2-6 which schematically illustrate the manner in which the strip illustrated in FIGURE 7 is taken from roll 43, fed to the typing mechanism, fed to the punching mechanism, cut and withdrawn from the automatic typing and punching apparatus.

FIGURE 2 schematically illustrates the initial or start typing operation wherein a brake member 81 is positioned against spindle 44 and brake elements 64 and 65 are maintained in their normal position against paper strip 45. This insures that no paper is withdrawn from roll 43 or the tape loop around roller 48 during the typing, punching and cutting operations. All of the paper necessary for any one message segment or strip is available from the loop between brake elements 64 and 65, around roller 51 and to the roller 52, the roller 51 being translatable to the right, as illustrated in the drawing.

A solenoid 82 for causing the brake element 63 to contact the paper and press it against brake element 62 is de-energized in this position, being under the control of microswitch contacts 83 and relay contacts 84 both of which are open at this time. The contacts 83 and 84 are connected in a circuit between the positive and negative terminals of a suitable power supply which is connected in series with brake solenoid 82. Accordingly, energization of brake solenoid 82 results only when contacts 83 and 84 are both closed. In the position illustrated in FIGURE 2, roller 51 is translated to its most extreme left position to maintain contacts 83 open, the contacts closing whenever roller 51 leaves its extreme left position. Contacts 84 are closed only in response to movement of the paper tape to the extreme left carriage position after punching has terminated.

In the start typing position, a finger or rod 85 extends through aperture 79, located just to the left of the strip which is to be printed on by type bars in basket 60. Rod 85 which is mounted on translatable paper holding and control mechanism 58 is used to translate the paper in both horizontal directions during the typing and translating operations. Initially, the paper is in its lowest vertical position so the typewriter keys in basket 60 strike the uppermost line thereof.

As seen in FIGURE 3, the typing operation of the upper line has been completed when the additional length of paper required to permit leftward movement of the strip has been withdrawn from the loop defined by roller 51. The roller 51 is translated to the right one-half the distance of movement of the pin 85. This causes contacts 83 to close but does not result in actuation of brake solenoid 82 because contacts 84 have not been closed. Thus, brake surfaces 64 and 65 still hold the paper surface 45 in place and no paper is taken from roll 43. Due to the translation of roller 51, which is spring biased to the left, the paper between the pin and the brakes 64, 65 is maintained taut in spite of movement of the pin 85, and therefore of the paper, as successive lines are printed.

After the typing of the various lines is completed, paper strip 45 is moved downwardly to its original vertical position relative to basket 60. Paper position controller 58 is translated to the left, FIGURE 4, causing finger 85 and paper 45 to be correspondingly translated to the left to a position proximate punch station 61. Roller 51 is now translated far to the right and almost all of the paper originally in the loop between brakes 64 and 65 and roller 52 is supplied to the typewriter mechanism. It is to be noted that sufficient paper is played out when the punching operation begins to position the paper strip at a point relative to type basket 60 almost where typing on the next strip is to begin.

Successive movements of the finger 85 move the tape through punch mechanism 61 and after punching has been completed, FIGURE 5, roller 51 is moved to its right limit and the paper position controller 58 is in its extreme left position almost directly in contact with punch 61. Since roller 51 is at its extreme right limit, switch contacts 84 are closed to complete the circuit for energizing brake solenoid 82 through relay contacts 84. This causes brake elements 64 and 65 to disengage and produces engagement of brake elements 62 and 63. At this time, the free end of the tape is engaged by a brake 86 in the punch mechanism 61.

The roller 48 is now translated toward the right and roller 51 toward the left since spring 87 connected to roller 51 is twice as strong as spring 88 connected to roller 48. Thus, the supply of paper in the loop around the roller 51 is replenished by the loop of paper previously existing around the roller 48. When roller 48 is translated from its home position, adjacent spring 88, under the influence of the force on the paper from movement of finger 85 to the punch station 61 roller or spindle brake 81 is disengaged and paper is permitted to be taken from roll 43. However, due to the engaged position of brake elements 62 and 63, no paper is now taken from roll 43. When roll 51 is returned to its leftmost position, contacts 83 open, brake solenoid 82 is de-activated, causing de-activation of elements 62 and 63 and actuation of brake elements 64 and 65. Only then is paper payed out from roll 43 under the force of the spring 88 which causes the roller 48 to return to its leftmost or initial position. When roller 48 reaches this position, the brake 81 is actuated and the spindle 44 is braked.

When roller 51 is returned to the left and contacts 83 are opened, the paper positioner 58 and guillotine element 59 are permitted to return to their initial positions as illustrated in FIGURE 6. When guillotine 59 reaches its initial position, shear member 89 is actuated and the paper is cut (FIGURE 6). After the paper is cut, a pinch roll, located within punch 61 removes the printed and cut strip to permit its ultimate utilization.

The system is now in the same position as illustrated in FIGURE 2 and the cycle may be repeated. The cycle may be repeated until the paper tape supply is exhausted at which time a new roll 43 is supplied and the tape is threaded by hand.

FIGURES 8–10, together with FIGURE 1, illustrate the specific paper feed and isolation mechanism employed in the present invention. The spindle 44 comprises a rotatable shaft 106 to which axially spaced hubs 93 and 107 are secured above the table 42.

Spaced about the outer circumference of the hub 93 are a plurality of retractable fingers 94, employed to bite into the inner circumferential edge of roll 43 to hold the roll. For withdrawal of teeth 94 from the outer periphery of hub 93, push button 95 is provided at the top of spindle 44. This push button, which operates in the normal fashion to withdraw teeth 94, is actuated only when it is wished to add or remove a roll of paper.

Paper feelers 95 and 97 located at different radial distances from hub 93 extend through apertures 98 and 99, respectively, in plate 42. Feeler 96 is included to provide an indication of when the paper roll 43 reaches a predetermined level, where it is almost played out. Feeler 97, located closer radially to hub 93 than feeler 96, generates indicating and machine stop signals when all of the paper has been utilized.

Both feelers 96 and 97 are normally spring biased in an upward direction but their action in the upward direction is normally inhibited by the paper roll 43 which they contact. As the paper is played out to a position less radial than feeler 96, it is urged upwardly by a spring bias and relay contacts 101 located on a pivotal arm 102 are actuated. Similarly, feeler 97 is urged upwardly by its spring 103 located beneath arm 102, FIGURE 10, when all of the tape has been played out. This results in actuation of relay 104 to provide a signal for the entire system to terminate its operation.

Slot 98 through which feeler 96 extends is of a generally elongated shape to permit the feeler to be located at different radial positions relative to hub 93. This is accomplished by controlling the position of arm 102 which is pivotable about rod 104a to which it is secured. The position of arm 102 is controlled by pin 105, FIGURE 1, located on the upper surface of plate 42. As the pin 105 is translated from the right position illustrated in FIGURE 1 to its leftmost position illustrated in the same figure, feeler 96 is moved from its position most remote from spindle 44 to a position most proximate the spindle. In this manner, feeler 96 is settable to be actuated at many different points depending upon when the personnel operating the machine and the officials in charge thereof are desirous of providing a warning signal indicative of low tape supply.

The actuator of brake 81 comprises an L-shaped plate 108 having one end 109 disposed in the path of movement of translatable member 111 upon which roller 48 is mounted. The apex of L-shaped plate 108 is pivotable about fixed shaft 112. The other end 113 of L-shaped plate 108 is connected by rod 114 to one end of brake lever actuator 115. Lever 115 is pivotable about a suitable point within brake actuator housing 116 so that it is engageable with shaft 106 to prevent its rotation. In the position of plate 108 illustrated in FIGURE 10, spring 117 urges lever 115 to a position at which the spindle brake 81 (FIGURES 2–6) within housing 116 is locked.

Upon movement of slider 111, to the right as viewed in FIGURE 10, L-shaped plate 108 is permitted to rotate clockwise about pivot point 112 under the force of spring 117 transmitted through rod 114 from lever 115. Rotation of lever 115 de-activates brake 81 and permits rotation of shaft 106 and roll 43. Stop 118, mounted on the end of lever 115 proximate to its connection to spring 117 and rod 114, limits the rotational movement of lever 115. The stop 118 makes contact with a suitable stationary element located beneath a damper 119.

Slides 111 and 121 to which rollers 48 and 51 respectively are secured are translatable on rods 122 and 123 and 124 and 125 respectively. Sliders 121 and 111 are normally urged toward the position shown in FIGURE 10 by spring tapes 126 and 127, respectively. One end of each of the tapes 126 and 127 is secured to its respective slider while the other end is secured to a point interior its respective spring housings 129 and 131. Spring 126 extends between slide 121 and the interior rotatable shaft of a spring housing 129, while spring 127 extends between slide 111 and a spring housing 131. The spring housing 129 and 131 are completely conventional mechanisms found in the typewriter art. The periphery of the rotating spring in the housing 129 is engaged by a member 133 secured to a spindle 134 of a damper mechanism 135. Similarly, the rotating spring in the housing 131 is provided with the damper mechanism 119, both mechanisms serving to damp the movement of the spring mechanisms and their associated members to prevent impacts, vibrations, over travel, etc.

The solenoid 82 for controlling tape braking members 63 and 64 is located beneath and in proximity to the edge of plate 42 where stationary rollers 47, 49 and 52 are located. As best seen in FIGURE 9, the braking mechanism in addition to elements 62–65 and 82 comprises a pair of pivotable arms 142 and 143 secured to a shaft 144 of the solenoid 82. The arms 142 and 143 carry brake members 63 and 64, respectively, which extend at right angles thereto upwardly through the table 42 and into the region of the paper tape. With the solenoid in the actuated positon illustrated in FIGURE 9 paper tape movement is restrained by braking elements 62 and 63 which clamp the tape or elongated paper 45 therebetween. Arm 143 integral with arm 142 is now positioned so that tape 45 is free to pass between brake surfaces 64 and 65.

Energization of brake solenoid 82 is partly effected by microswitch 83 corresponding with contacts 83 of FIGURES 2–6. With slider 121 in the position illustrated in FIGURE 10 i.e. away from its extreme left position roller 145 of microswitch 83 makes no contact with slider 121. In consequence microswitch contact 146 engages contact 147 thereof and an electrical connection is established through microswitch 83. However when slider 121 is translated to its leftmost position and roller 145 contacts the cam surface 147a of the slider 111 relay contact 146 is urged away from contact 147 and the electrical connection therebetween is broken.

Reference is now made to FIGURES 11—17 which illustrate the stationary paper positioner 55 and the control mechanism for the splined shaft 68. Located immediately to the right, in FIGURE 11, of platen 57 is paper holder 55 having a pair of fingers 161 and 162 folded upon themselves. Fingers 161 and 162 are centrally located on the paper-holding mechanism 55 and have located on each side thereof a pair of guides 163 and 164. When paper is inserted in horizontally stationary paper control mechanism 55, it is inserted between the vertical surfaces of the guides 163 and 164 and fingers 161 and 162, which may be considered as forming a bridge for the paper which is fed through them. Paper controller 55 is secured by a screw 166 extending through planar base 165 to a flange 167, see FIGURE 11, extending from vertically movable arm 168.

A pair of slots 169 and 171 extends in opposite directions from the central portion of arm 168. Vertical movement of arms 168 is restrained by stub shafts 172 and 173 secured to a stationary plate 176 which engages the left side of the arm 168. The shafts 172 and 173 extend through slots 169 and 171, respectively. Discs 174 and 175 extend radially from shafts 172 and 173 and engage the right side of arm 168 holding it against plate 176. The plate 176 is secured to a spacer member 187 by a bolt 181. The spacer 187 is secured in turn to a main frame member 188a of the typewriter housing. A member 183 formed on one end of L-shaped wall member 184 is also secured to spacer 187. The other end of member 184 is secured to end plate 185 as by a bolt 186.

The spacer 187, has a circular bore through which a shaft 188 extends. The shaft 188 rotatably supports the platen 57 and the spacer 187 maintains an appropriate separation between the platen and the stationary plate 176.

To control the vertical position of paper holder and positioner 55, there is provided a cam 191 and a cam follower arm 192. Cam 191 consists of eight separate stopping points 193-200 located about its periphery. The cam is driven clockwise, see FIGURE 14, in eight intermittent, discrete steps by splined shaft 68 on which the cam is mounted. A cam follower roller 202 is rotatably secured to and adjacent the lower side of driving arm 192 between its two extremities. When spline shaft 68 is rotated from the position shown, cam 191 is correspondingly rotated, and cam follower 202 is raised to a slightly higher position than illustrated and assumes a position corresponding with valley 197 on cam 191. Arm 192 rotates clockwise about pin 203, located at the most remote point relative to paper controller 55. The other end of arm 192 is fixedly attached to vertically movable arm 168 by pin 204. In this manner controller 55 is driven from its lower to its highest vertical position in small steps. The controller returns to its lowest position in a large step when follower 202 falls from valley 194 to valley 202. This action is assisted by the connections between arms 168 and 192 via spring 182 that connects the arms together. It will be noted that due to the manner of interconnection of arm 168 and plate 176, the arm 168 is caused to move along a straight line thereby maintaining a fixed relationship between the portion of the paper to be printed and the platen. If this were not insured, then the portion of the paper to be printed might not be in contact with the platen and the tape would be punctured or torn.

As cam 191 is driven by spline shaft 68, cams 206 and 207 located adjacent cam 191 are driven therewith. In engagement with cam 206 is a cam follower and micro-relay switch arrangement 208. Cam 206 drives roller 209 of microswitch 208 to its actuated position only when spline shaft 68 positions paper holder 55 in the further position where the first line is to be typed on the paper; i.e., the lowest position of the arm 192. At this time shear 59 is actuated by the relay 75 which is energized when the contacts of microswitch 208 are closed.

Cam 207 with its cam follower 211 and actuating relay 212 are provided for permitting return of the carriage to its initial position shown by FIGURE 2 when the holder 55 is in the fourth position corresponding with cam grooves 196 and 200. It is desirable to return the carriage to its original horizontal position with the vertical paper position holder maintained in the fourth line position to provide ease of paper tape loading. At such time, relay contacts of switch 212 are closed and the carriage is automatically returned to this position provided switch 213, FIGURE 1, is manually depressed.

To control the intermittent movement of spline shaft 68, there is provided a rotary solenoid 215 which rotates its shaft 216 first in one direction and then the other in discrete 45° angles each time a voltage pulse is applied to the solenoid in response to an end of the line code of the system input signal.

The 45° rotation of shaft 68 in one direction in response to oscillation of shaft 216 is controlled by detent wheel 217, ratchet wheel 218 and pawl 226. The wheel 217, secured to splined shaft 68, is detented by a detent roller 219 and arm 221 having a shaft 223 secured to one end of spring 224, the other end of which is secured to post 225. Arm 221 is free to pivot about a stationary pivot point, stub 222, so that spring 224 maintains a detenting force between roller 219 and spur wheel 217. Rotation of ratchet wheel 218 secured to shaft 68 is effected by pawl 226 rotatably secured, at its end remote from the teeth of wheel 218, to a shaft 227. The shaft 227 is carried on a plate 234 secured to shaft 216 of solenoid 215. Pawl 226 is normally maintained in contact with the teeth of wheel 218 by a spring 233, see FIGURE 16, which biases the pawl toward the wheel 218.

In operation, upon energization of relay 215, shaft 216 is rotated and rotates plate 234. Rotation of plate 234 causes clockwise rotation of shaft 227 about shaft 216 as a center. The pawl 226 moves with shaft 227 and produces rotation of the wheel 218 secured to shaft 68. The detent 219 and detent wheel 217 insure precise final positioning of the shaft 68. Upon de-energization of solenoid 215, the shaft 216 rotates to its original position carrying plate 234, shaft 227 and pawl 226 therewith. The pawl 226 rotates relative to shaft 227 to clear the teeth of wheel 218 on this backstroke.

To insure rotation of the solenoid 215 and more specifically its shaft 216 through 45° in spite of variations in lead on the shaft or of the lengths of the input signal employed to control the solenoid, a holding circuit is provided. This holding circuit includes a switch 231 which is closed except when the solenoid shaft 216 is fully rotated. Specifically the switch includes a contact 243 and a contact 244 carried on a bendable arm 242. The arm 242 is operated by a further arm 245 which carries a cam follower 237. The follower 237 engages a cam 229 rotatable about a shaft 232 carried by the plate 185. The cam 229 is slotted at 236 to receive a pin 235 carried on an arm 240 secured to shaft 216.

The pin 235 and slot 236 are proportional so that upon rotation of shaft 216, counterclockwise, the pin 235 does not engage the lower edge of the shaft 236 until near the end of the stroke of the shaft. Therefore, the cam follower 237 remains in flute 239 on cam 229 and the contacts 243 and 244 remain closed. Towards the end of the stroke of shaft 216, the pin 235 causes the cam 229 to rotate and at the end of the stroke of the shaft the cam follower 237 enters a flute 241 and the contacts 243 and 244 are separated. The holding circuit for relay 215 is now broken and the relay de-energized. The shaft 216 now rotates clockwise, but again due to the lost motion between pin 235 and the walls of slot 236, the pin does not engage the upper wall of the slot until near the end of the return stroke of the shaft 216. At this time, the cam 229 is rotated counterclockwise, the roller 237 enters flute 239 and contacts 243 and 244 are again closed. Thus, the solenoid 215 cannot be reenergized until it has completed its return stroke, thereby insuring that the pawl 226 engages a new tooth on wheel 218 so that the shaft 216 will be rotated upon re-energization of the solenoid.

In summary, an incoming signal calling for actuation of solenoid 215 causes a holding circuit to be established which includes switch 231. The switch is opened only when shaft 216 has been rotated 45°, thereby opening the holding circuit and de-energizing the solenoid. The switch 231 remains open until the shaft 216 is returned fully to its original position, insuring that the solenoid 215 cannot be again energized until all elements are ready for the next drive cycle.

Reference is now made to FIGURES 18-22 which illustrate in detail the translatable paper holding and control mechanism 58. The holder 58 is supported on the movable carriage 244 of the basic typewriter by means of a plate 243 bolted thereto, as by bolts 245 and 246.

Fixedly mounted on plate 243 is a vertical plate 272 which carries a further vertical plate 249 extending approximately at right angles to plates 243 and 272.

Vertically translatable on plate 249 is a substantially U-shaped plate 252 having its legs 253 and 254a in intimate contact with the opposite surfaces of plate 249. Fixedly mounted on the leg 253 of U-shaped member 252 is a paper receiving plate 254 having raised midportion disposed between two flat portions 255 and 256 which carry bolts 257 and 258, respectively. Bolts 257 and 258 extend through bores provided in portions 255 and 256, extend through a vertical slot 251 in member 249, and engage in the leg 254a. Thus, the paper receiving plate 254 may be vertically adjusted to accommodate the vertical position of the tape 45.

With the paper strip inserted through the upraised portion or plate 254, a surface 261 of finger 85, said surface extending at right angles to the plane of paper 45, is biased by spring 262 through hole 79 in strip 45. Surface 261 rests against the edge of hole 79 in the same direction relative to the hole center as the direction in which the paper is translated between printing mechanism station at platen 57 and punch 61. Finger 85 and spring 262 are within sleeve 264 that is fixedly mounted on vertically translatable plate 252 and extends through a suitable elongated aperture 251 in the plate 249. As the paper is inserted through the slot formed by the midsection of paper holder 254 and plate 252, spring 262 is initially compressed until aperture 79 is positioned in front of tip 265. Spring 262 is maintained in place by fixed shaft 263, located interiorly of sleeve 264. Translation of paper strip 45 relative to finger 85 is terminated upon insertion of tip 265 in aperture 79. A cam surface 266 located at the opposite side of tip 265 from cam surface 261 is provided to permit disengagement of the paper from the finger 85. The surface 265 extends at a 45° angle to paper 45 and is adapted to be engaged by the opposite edge of aperture 79 than flanged cam surface 261. After the left end of strip 45 has been secured by the brake 86 in the punch at the extreme left side of the machine, holder 58 is translated toward basket 60. The paper exerts sufficient force on cam surface 266 to compress spring 262 and force complete withdrawal of finger 85 from aperture 79 in the paper. Thereafter, free relative movement between the mechanism 58 and paper is permitted until the next hole 79 is encountered by finger 85.

Vertical movement of paper holder 254 is accomplished in a manner similar to vertical movement of fixed paper holder 55, comprising fingers 161 and 162. Thus, an eight position cam 267 is mounted on the splined shaft 68 and rotatable therewith. Roller 268 located at the bottom of and in the middle of pivotable arm 269 is driven by cam 267 to effect vertical translation of paper holder 254. The end of arm 269 remote from paper holder 254 is pivotable about shaft 271, carried by a member 273. At the other end, the arm 269 is secured to U-shaped plate 252 by pivot pin 274.

Thus, as shaft 68 is rotated in response to actuation of solenoid 215, arm 269 is pivoted about shaft 271 causing paper holder 254 to be translated in a vertical direction. It is to be noted that cams 267 and 191 are provided with eight cammed indentations, four on each half of the cam wheel. This technique of eight rather than four cam positions is employed because of the general availability of 45° solenoid shaft drivers. Accordingly, paper holder 254 is driven through two complete cycles for each revolution of shaft 68.

Mounted at the top of plate 272 are a pair of cylinders 71 and 72 which support the right ends of rods 73 and 74. Cylinders 71 and 72 are held against plate 272 by L-shaped plate 278 extending from the latter. The purpose of the rods 73 and 74 will become apparent as the description proceeds.

Reference is now made to FIGURES 23–28 for a description of the guillotine or shearing mechanism employed in the present invention. Guillotine assembly 59 is translatable with holder assembly 58 under all conditions except when in proximity to the punch 61, located at the extreme left side of the machine. The normal relationship of guillotine assembly 59 relative to rods 73 and 74 is established by a latching mechanism including a plate 281 secured to shaft 73 by collar 282. Under normal conditions, a rectangular indentation of an arm 283 contacts the left surface, as viewed in FIGURE 23, of plate 281. The extreme left surface 284 of a cylinder 293 on which the guillotine assembly 59 is mounted contacts the right side of the arm 281. The arm 283 is supported on a shaft 311 carried by a plate 322 secured to the guillotine assembly 59 and accordingly is normally immovable relative to the surface 284. The guillotine assembly is thus maintained stationary relative to the paper holding assembly 58 since the plate 281, secured to shaft 73 is clamped between two members of the guillotine mechanism.

With the paper strip 45 in its initial condition, as illustrated in FIGURES 2 and 6, the guillotine assembly 59 is located adjacent the rotating arm 76 and the solenoid 75 which actuates it. In this position, a roller 285 is disposed immediately above the plate 76 at a point remote from the plate pivot point coincident with the center of output shaft 286 of the solenoid 75. Roller 285 is fixed to one end of a pivotable arm 287, see FIGURE 24, the other end of which serves as the cutting blade 288 for the shear 59. Arm 287 includes two members at right angles to one another and having their apex pivotally mounted on a shaft 289. The shaft 289 is carried by a plate 292 secured to the cylinder 293 and a further cylinder 294 which slide on rods 73 and 74, respectively. Nuts 295 and 296 are located on opposite sides of arm 287 and plate 292, respectively, a washer 297 being positioned between members 287 and 292 to permit free movement of blade 288. The plate 292 also supports a stationary blade 291 of the cutter.

As best seen in FIGURE 25, plate 76 engages roller 285 at the beginning of the cutting operation at a point remote from the pivot point of plate 76 and while the plate is substantially horizontal. In this position, blade 288 is separated from stationary blade 291. When solenoid 75 is actuated, shaft 286 rotates arm 76 and roller 285 is driven in an upward direction. Arm 287 is pivoted about shaft 289 which results in blade 288 being moved toward the stationary blade 291 to cut the paper strip. Upon de-energization of solenoid 75, shaft 286 is rotated in a counterclockwise direction, opposite to the direction in which it was intially rotated, and roller 285 is returned to its normal position. The actuated position of roller 285 is shown by dotted lines in FIGURE 25.

To insure withdrawal of movable plate 288 upon de-energization of solenoid 75, compression spring 301, extending between plate 302 and the segment of guillotine 59 just above cutting surface 288 is provided. Movable within compression spring 301 is guide rod 303 secured to the arm 288. Rod 303 is employed to restrict movement of cutting edge 288 and to serve as a holder for spring 301.

The manner in which the paper strip 45 is cut is best seen by reference to FIGURE 27. Paper strip 45 is normally maintained against the surface 304 of stationary shear member 291. When roller 285 is upset, that is, driven upwards, movable shear member 288 is driven towards paper 45 so that its cutting edge 305 is translated past the paper surface 45 and contiguous to surface 306 of shear element 291. This action plus the fact that since the blade 288 is pivoted about shaft 289, the point of shear travels downwardly with increased rotation, provides a scissor action which produces a clear cut in the tape.

Figure 30:
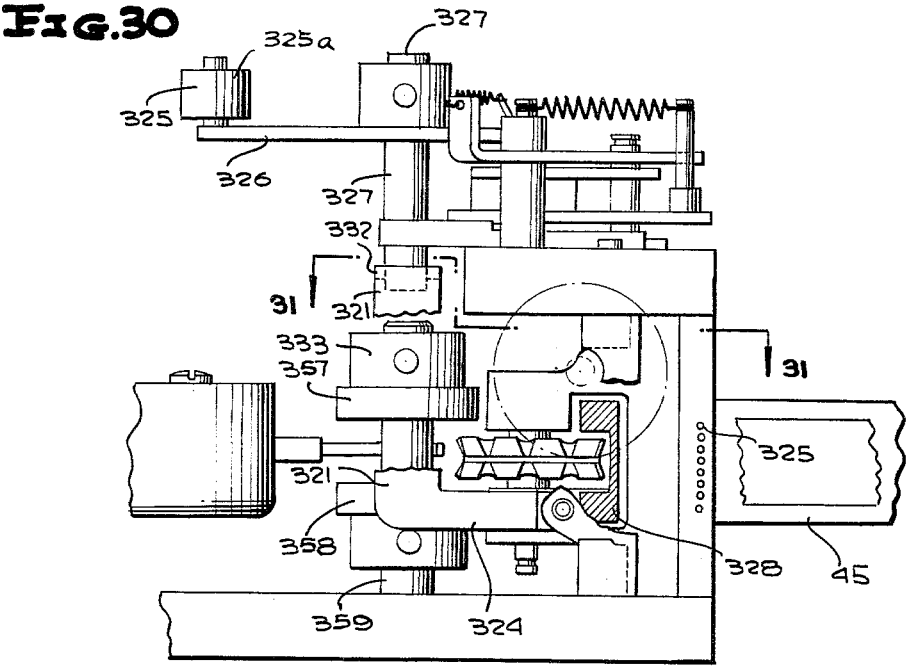
FIGURE 30 is an elevational view of the punch mechanism illustrated in FIGURE 29, taken along the lines 30—30.
Figure 31:
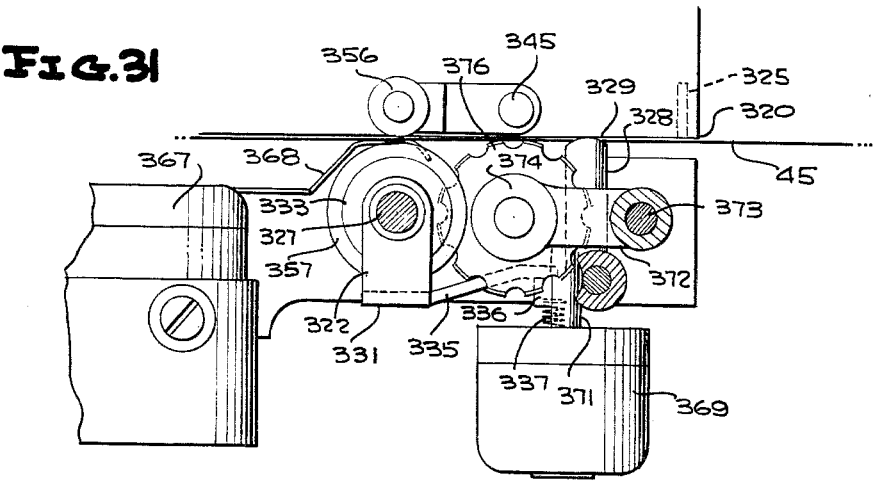
FIGURE 31 is a top sectional view of the punch mechanism illustrating the manner in which the paper is fed thereto, said view being taken along the lines 31—31 of FIGURE 30.

Reference is now made to FIGURES 29–31 which illustrate the extreme lefthand side of the machine where the punch mechanism is located. After the last printing function has taken place, the carriage is moved to the left to cause the end of the tape to be inserted into the punch. As the guillotine assembly approaches the punch assembly an arm 312 of a bell crank including arm 283, pauses over the top of the punch assembly and is engaged by a vertical stud 313. Translation between cutter 59 and paper holder 58 has been achieved by pivoting arm 283, carried by the guillotine structure 59, away from the stopped surface of arm 281, carried on rod 73. Arm 283 is pivotably mounted on shaft 311 which has a further arm 312 extending substantially at right angles to arm 283. Arm 312 is located beneath arm 283 and also beneath cylinder 282 which carries brake arm 281. As the guillotine is translated to the left, arm 312 comes in contact with stud 313, fixedly located on punch assembly 61. The position of stud 313 relative to arm 312 is illustrated in FIGURE 29 and in FIGURE 26 wherein the stud is depicted in dotted lines because it is actually in front of the view rather than behind as illustrated.

When arm 312 is rotated by engagement with the stud 313, arm 283 is rotated out of engagement with the plate 281 and rods 73 and 74 are permitted to translate further to the left while guillotine assembly 59 remains in contact with the side of the punch member and in the position illustrated in FIGURE 29. However, paper holder 58, being fixedly secured to rods 73 and 74, continues to translate therewith until its movement being limited by contact with the guillotine assembly 59 as shown in FIGURE 29.

After the punching operation is completed and roller 51 returns to its home position, the carriage is translated to the right and the bell crank 283–312 is rotated to its initial position by tension spring 314 secured at one end to the guillotine main structure and at its other end to bolt 315 located on housing 316. As the carriage initially moves back to the right, paper holder assembly 58 is moved therewith but guillotine structure 59 remains against the punch structure because of the action of a tension spring 317 which extends between the cylinder 282 secured to shaft 73 and an arm 321 secured to the guillotine assembly. Spring 317 is secured to cylinder 282 by its connection with groove 318 in post 319, carried by the cylinder. As the plate 281 moves past arm 283, the latter is rotated to allow the plate to pass and thereafter rotates back to its initial position and engages plate 281 in its left side to complete the latching action.

When guillotine structure 59 and holder 58 are initially brought to the extreme left side of the machine, in proximity to punch 61, the latter elements are maintained apart. The paper 45 is inserted in a slot 320 (FIGURE 31) on the right side of punch mechanism 61 until it comes in front of punch pins 325 located interiorly of the punch. The punch is actuated in response to the same intelligence which energizes the typewriter to punch columns of holes in the paper strip 45 in the manner indicated at 78, FIGURE 7. A first column is punched, after which the paper 45 and paper holder 58 are translated to the left by the carriage movement mechanism. A further vertical row is punched by pins 325 after which further translatory movement of paper 45 and paper holding mechanism 58 is effected. This operation is continued until the required number of columns have been punched at which time paper holder for finger 58 is translated completely to the left.

When finger 58 is translated to its left-most position, abutting against guillotine 59, rod 74 comes into engagement with roller 325a, mounted at one end of arm 326 secured to rotatable shaft 327. Rotation of shaft 327 in response to actuation of roller 325a by rod 74 results in a brake 328, FIGURE 31, being forced against paper strip 45 and fixed surface 329, located interiorly of punch 61. As indicated above, the brake 328 is actuated by rotation of shaft 327. The shaft carries, interiorly of the punch mechanism, an L-shaped member having a leg 332 secured to shaft 327 and at right angles thereto. The other leg 331 of the L-shaped member extends across the punch (from top toward bottom) and carries on its lower end an arm 335 extending at a right angle to member 331 and toward the right of the machine. The right end of the arm 335 overlies a shoulder 336 on the brake 328 holding it out of engagement by opposing the force of a spring 337 urging the brake 328 towards the paper strip 45. Upon rotation of shaft 327, plate 335 is rotated towards paper sheet 45, as viewed in FIGURE 31 and the compression spring 337 presses the brake 328 against the paper tape 45, and the tape against the interior wall 329. Once the punching operation has been completed, the carriage returns to its right hand position carrying shaft 73 with it and thereby moving the shaft out of contact with roller 325a. When roller 325a is actuated by shaft shaft 74, it rotates arm 326 so that a notch 341 at the right end of arm 326 is engaged by latch 338. The arm 326 is held in this position with the brake 328 actuated until the latch is released, this occurring only when the guillotine is operated.

A belt 342 has one end secured to the plate 299 (FIGURES 25 and 28) which carries the guillotine operating member 76. The belt 342 extends across the back of the machine, makes a right angle turn around a roller 343 and is secured to a plate 344 which pivots about a shaft 345.

When the guillotine is actuated and belt 342 is translated to the right as illustrated in FIGURE 1, the end of plate 344 secured to the belt 342 is rotated towards the rear of the punch 61 assembly against the force of return spring 352. This results in a post 346, mounted on plate 344 at the end proximate belt 342, to engage an extension 347 of the arm 339. Arm 339 is rotated and latch 338 is disengaged from notch 341. Arm 326 and roller 325a are now reset to their original positions by spring 365 so that brake 328 is released and the cut strip may now be expelled from the punch.

As seen in FIGURE 31, pinch roller 356 is fixedly mounted on the shaft 345. Upon rotation of shaft 345 the pinch roller 356 presses the cut paper 45 against constantly moving cylinders 357 and 358, FIGURE 30, both of which are driven by shaft 359 of motor 361, FIGURE 1. Rotation of the shaft 345 is to be effected only after the strip 45 has been completely cut which is near the end of operation of the solenoid 75. To insure the above, the shaft is secured to a plate 362 disposed above and parallel to plate 344. The plate 362 carries a stud 363 which extends into a slot 364 in the plate 344. The slot 364 and stud 363 are proportioned such that the stud 363 is engaged by the lower edge of slot 364 only near the end of counterclockwise rotation of plate 344 which is after the strip has been cut. The plate 362 is now rotated and rotates the shaft 345 to cause the pinch roller 356 to press the strip against rollers 357 and 358.

When roller 356 is brought into engagement with wheels 357 and 358, microswitch 367, having a feeler arm 368 disposed between roller 357 and paper 45, is actuated due to the contact between rollers 356 and 357. Microswitch 367 actuates a pair of contacts which provide a signal to an electrical control system which enables it to now supply a new signal sequence for control purposes.

If a void signal is generated due to malfunction of the present system in conjunction with its receiving system, a signal is generated for actuating solenoid 369. Actuation of solenoid 369 results in shaft 371 carried thereby to be translated toward the paper strip 45. Extension 371 contacts arm 372 pivotally rotatable on shaft 373, which is secured to punch 61 housing. The other end of arm 372 is secured to a boss 374 to which toothed wheel 376 is secured. When arm 372 is rotated about shaft 373 in response to actuation of solenoid 369, toothed wheel 376 comes into engagement with strip 45 as the strip 45 is carried through the punch by rollers 357 and 358, sharp teeth on the wheel 376 cut the strip. This causes the strip to be destroyed so that it will not be erroneously posted.

While we have described and illustrated one specific embodiment of our invention, it will be clear that variations of the details of construction which are specifically illustrated and described may be resorted to without departing from the true spirit and scope of the invention as defined in the appended claim.

What we claim is:

A system for displaying data on strips of display material derived from a single elongated strip of said material comprising a stationary printing station for printing the data on said strip, means for restraining longitudinal movement of said strip, means for successively engaging and moving said strip longitudinally into engagement with said printing station and with said restraining means, means for activating said restraining means to restrain said strip when said means for engaging and moving brings a first segment of said strip to said restraining means and means for cutting said first segment from the remainder of said strip while said engaging and moving means engages a segment of said strip on said remainder said engaging and moving means having means for moving said strip transverse to its elongated dimension while said restraining means is activated, said means for moving said strip including a bridge for holding said strip, an arm pivotally secured to said bridge at one point and rotatable about another point remote from said bridge, means coupled to a further point on said arm intermediate said one and another points, for intermittently pivoting said arm about another point to drive said bridge to a plurality of discrete predetermined locations, and guide means coupled to said bridge for controlling the position thereof.

References Cited by the Examiner

UNITED STATES PATENTS

| | | | |
|---|---|---|---|
| 584,366 | 6/1897 | Johnson | 197—1.6 |
| 662,147 | 11/1900 | Gabrielson | 197—158 |
| 926,036 | 6/1909 | Trejo | 197—170 |
| 949,257 | 2/1910 | Barney | 197—158 |
| 1,265,328 | 5/1918 | Henderson | 178—42 X |
| 1,522,223 | 1/1925 | Barker | 197—133 |
| 1,706,666 | 3/1929 | Harris | 197—133 |
| 1,770,888 | 7/1930 | Long et al. | 178—42 |
| 2,112,833 | 4/1938 | Dybvig | 197—133 |
| 2,152,841 | 4/1939 | Edmunds | 197—133 X |
| 2,271,306 | 1/1942 | Nichlos | 197—133 |
| 2,301,054 | 11/1942 | Laing | 226—87 |
| 2,366,022 | 12/1944 | Handley | 197—133 |
| 2,389,200 | 11/1945 | Lake | 178—42 |
| 2,399,369 | 4/1946 | McFarland | 197—138.5 X |
| 2,428,510 | 10/1947 | Bradley | 197—133 |
| 2,432,967 | 12/1947 | Johnson | 197—133 |
| 2,534,461 | 12/1950 | Lorenz et al. | 197—122 X |
| 2,631,493 | 3/1953 | Hayek | 226—87 |
| 2,655,098 | 10/1953 | Dutro et al. | 234—37 |
| 2,858,004 | 10/1958 | Febvre | 197—151 |
| 2,919,008 | 12/1959 | Whippo | 197—157 |
| 2,978,086 | 4/1961 | Hickerson | 197—16 |

FOREIGN PATENTS

| | | |
|---|---|---|
| 371,652 | 4/1932 | Great Britain. |

ROBERT E. PULFREY, *Primary Examiner.*

ROBERT A. LEIGHEY, *Examiner.*